United States Patent
Shook et al.

(10) Patent No.: US 12,352,217 B2
(45) Date of Patent: Jul. 8, 2025

(54) DIRECT CONTROL VARIABLE DISPLACEMENT METERING PUMPS

(71) Applicant: Hamilton Sundstrand Corporation, Charlotte, NC (US)

(72) Inventors: Ryan Shook, Loves Park, IL (US); Ryan Prescott Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 174 days.

(21) Appl. No.: 18/202,534

(22) Filed: May 26, 2023

(65) Prior Publication Data

US 2024/0392728 A1    Nov. 28, 2024

(51) Int. Cl.
*F02C 9/30* (2006.01)
*F04B 49/06* (2006.01)
*F04C 14/24* (2006.01)

(52) U.S. Cl.
CPC .............. *F02C 9/30* (2013.01); *F04B 49/06* (2013.01); *F04C 14/24* (2013.01); *F04C 2270/185* (2013.01); *F04C 2270/585* (2013.01)

(58) Field of Classification Search
CPC ...... F04C 9/30; F04C 14/24; F04C 2270/185; F04C 2270/585; F04B 49/06
See application file for complete search history.

(56) References Cited

U.S. PATENT DOCUMENTS

| | | | |
|---|---|---|---|
| 5,806,300 A | 9/1998 | Veilleux et al. | |
| 6,102,001 A | 8/2000 | McLevige | |
| 8,348,630 B2 | 1/2013 | Tysver et al. | |
| 8,572,974 B2 | 11/2013 | Veilleux, Jr. | |
| 9,234,464 B2 | 1/2016 | Benson | |
| 10,495,218 B2 | 12/2019 | Johnson et al. | |
| 2006/0130455 A1* | 6/2006 | Griffiths | F23R 3/343 60/39.281 |
| 2007/0044768 A1 | 3/2007 | Eick et al. | |
| 2012/0219429 A1* | 8/2012 | Heitz | F02C 9/263 417/44.1 |
| 2018/0058449 A1 | 3/2018 | Johnson et al. | |
| 2018/0163637 A1 | 6/2018 | Griffiths | |

(Continued)

FOREIGN PATENT DOCUMENTS

| | | |
|---|---|---|
| EP | 2913500 A1 | 9/2015 |
| EP | 4063654 A2 | 9/2022 |

OTHER PUBLICATIONS

Extended European Search Report dated Oct. 8, 2024, for corresponding European Patent Application No. 24177624.4.

*Primary Examiner* — Connor J Tremarche
(74) *Attorney, Agent, or Firm* — Kinney & Lange, P.A.

(57) ABSTRACT

A system includes a variable displacement pump (VDP) in fluid communication with an inlet line and with an outlet line. The VDP includes a variable displacement mechanism configured to vary pressure to the outlet line. An electromechanical actuator (EMA) is operatively connected to actuate the variable displacement mechanism. A flow sensing valve (FSV) connected in the outlet line. The FSV includes a sensor configured to generate sensor data indicative of flow out of the outlet line. A controller is operatively connected to the EMA to control the variable displacement mechanism based on the sensor data to support flow demands from one or more downstream systems.

14 Claims, 2 Drawing Sheets

(56) References Cited

U.S. PATENT DOCUMENTS

| | | |
|---|---|---|
| 2018/0340501 A1 | 11/2018 | Ni et al. |
| 2019/0032509 A1* | 1/2019 | Muldal .................... F02C 9/34 |
| 2020/0141332 A1* | 5/2020 | Griffiths ................. F02C 9/263 |
| 2022/0372968 A1* | 11/2022 | O'Rorke ................. F04B 17/05 |
| 2023/0023310 A1 | 1/2023 | Goy |

* cited by examiner

DIRECT CONTROL VARIABLE DISPLACEMENT METERING PUMPS

BACKGROUND

1. Field

The present disclosure relates to pump control, and more particularly to control for variable displacement pumps (VDPs).

2. Description of Related Art

Variable displacement pumps (VDPs) can support flow for fuel burners, e.g. combustors and augmentors in gas turbine engines such as on aircraft. There is an ongoing need for reducing fuel system weight and pump system heat rejection to allow aircraft to carry more fuel and increase aircraft heat rejection into fuel. There is also an ongoing need for increasing reliability and reducing part count. There is a further ongoing need to increase fuel flow accuracy.

The conventional techniques have been considered satisfactory for their intended purpose. However, there is an ever present need for improved systems and methods for control of VDPs. This disclosure provides a solution for this need.

SUMMARY

A system includes a variable displacement pump (VDP) in fluid communication with an inlet line and with an outlet line. The VDP includes a variable displacement mechanism configured to vary pressure to the outlet line. An electromechanical actuator (EMA) is operatively connected to actuate the variable displacement mechanism. A flow sensing valve (FSV) connected in the outlet line. The FSV includes a sensor configured to generate sensor data indicative of flow out of the outlet line. A controller is operatively connected to the EMA to control the variable displacement mechanism based on the sensor data to support flow demands from one or more downstream systems.

The FSV can include an FSV inlet, an FSV outlet, and a valve member. A biasing member can bias the valve member in a first direction. Pressure of flow through the FSV from the FSV inlet to the FSV outlet can bias the valve member in a second direction opposite the first direction. The sensor can include a position sensor operatively connected to monitor position of the valve member in the FSV to generate the sensor data as feedback for the controller. The FSV can include a pressure port on a side of the valve member opposite from the FSV inlet and the FSV outlet. A pressure line can connect the FSV outlet in fluid communication with the pressure port.

A minimum pressure shutoff valve (MPSOV) can be connected in fluid communication with the outlet line, configured to block flow through the outlet line for shutoff. A first MPSOV line can connect the MPSOV in fluid communication with the inlet line. The first MPSOV line can include a first fixed throttle. A second MPSOV line can connect the MPSOV to the outlet line for fluid communication. An MPSOV control line can connect the MPSOV in fluid communication with the inlet line through a second fixed throttle. A solenoid valve (SOL) can be connected in fluid communication with the outlet line and with the MPSOV control line for actuating the MPSOV between first and second states. The MPSOV can include an MPSOV valve member with a first position in the MPSOV that connects the first and second MPSOV lines in fluid communication and allows flow though the outlet line, and a second position that disconnects the first and second MPSOV lines from being in fluid communication and blocks flow through the outlet line.

The SOL can be operatively connected to the controller for the controller to switch states of the MPSOV. A pressure sensor can be operatively connected to the outlet line to generate sensor output indicative of pressure in the outlet line. The pressure sensor can be operatively connected to the controller for active control of the variable displacement mechanism and/or of the MPSOV based on pressure in the outlet line. A position sensor can be operatively connected to the variable displacement mechanism to provide sensor output indicative of position of the variable displacement mechanism. The position sensor can be operatively connect the controller to provide feedback for controlling the variable displacement mechanism.

A method includes directly controlling a variable displacement pump (VDP) by actuating a variable displacement mechanism of the VDP with an electromechanical actuator (EMA). The method includes receiving sensor feedback from a flow sensing valve (FSV) indicative of flow supplied to a downstream system supplied from an outlet line of a variable displacement pump (VDP). The method includes controlling an minimum pressure shutoff valve (MPSOV) to set a minimum pressure of the outlet line, and wherein the MPSOV is connected to selectively shut off flow in the outlet line.

The method can include receiving pressure data from a pressure sensor in the outlet line, wherein directly controlling the VDP and controlling the MPSOV are done based at least in part on the pressure data. The method can include receiving data from a sensor indicative of position of a valve member of the FSV, wherein directly controlling the VDP and controlling the MPSOV include directly controlling the VDP and controlling the MPSOV based on position of the valve member. Controlling the MPSOV can include shutting off flow from the outlet line to one or more downstream systems in response to pressure below the minimum pressure of the outlet line upstream of the MPSOV. Directly controlling the VDP can include receiving input from a position sensor operatively connected to the variable displacement mechanism to provide sensor output indicative of position of the variable displacement mechanism, and using the sensor output as feedback for controlling the variable displacement mechanism.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
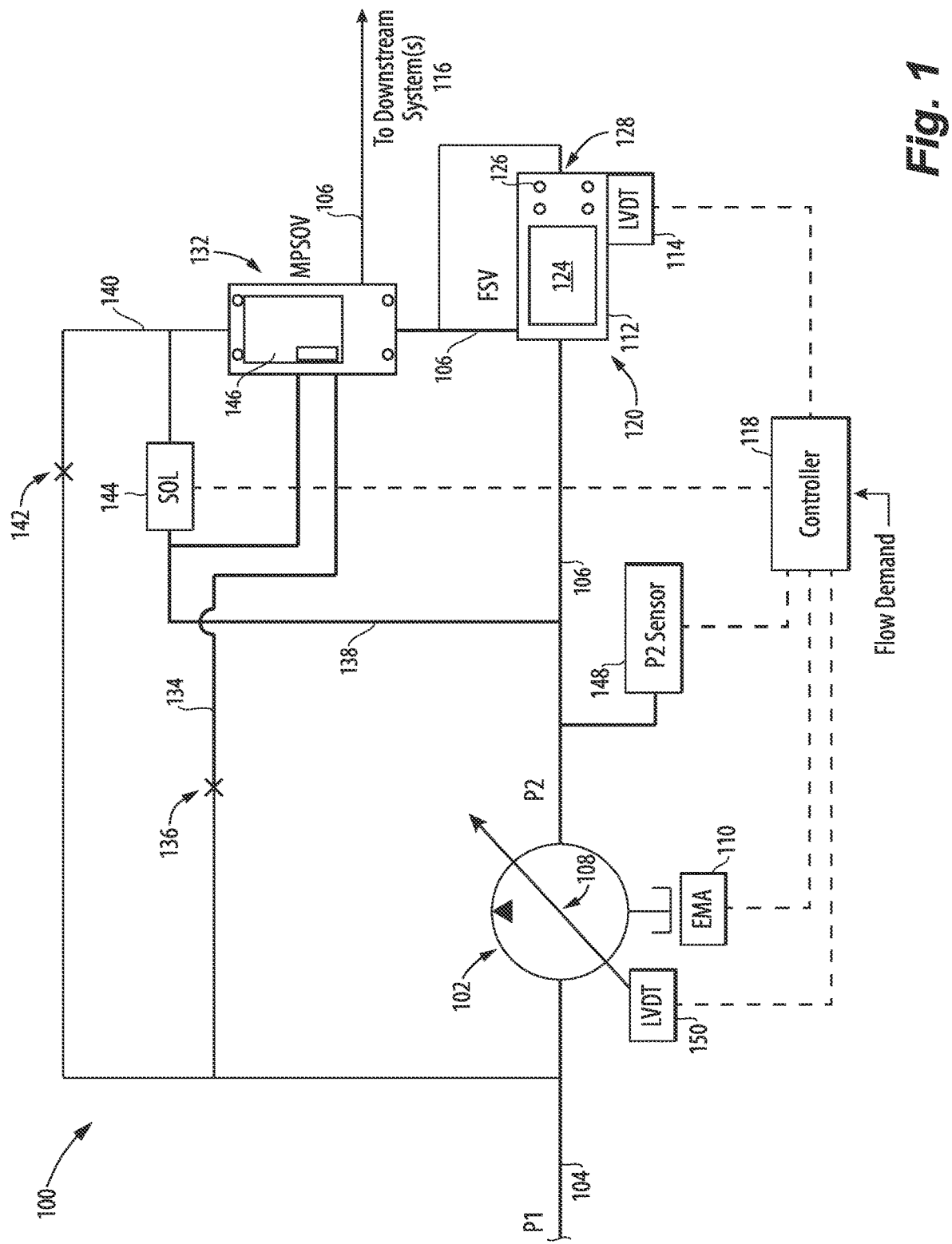
FIG. 1 is a schematic view of an embodiment of a system constructed in accordance with the present disclosure, showing the connections of the variable displacement pump (VDP), a flow sensing valve (FSV), and a minimum pressure and shutoff valve (MPSOV) for shutting of flow to the downstream systems such as a gas generator of a gas turbine engine.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide direct electrical actuation control for variable displacement pumps, such as for use in metering/supplying fuel to gas generators in aircraft engines.

The system 100 includes a variable displacement pump (VDP) 102 in fluid communication with an inlet line 104 and with an outlet line 146. The VDP 102 includes a variable displacement mechanism 108 configured to vary pressure to the outlet line 106. An electromechanical actuator (EMA) 110 is operatively connected to actuate the variable displacement mechanism 108. A flow sensing valve (FSV) 112 connected in the outlet line 106. The FSV 112 includes a sensor 114 configured to generate sensor data indicative of flow out of the outlet line 106 to the downstream systems 116, such as gas generators like combustors, augmentors, or the like. A controller 118 is operatively connected to the EMA 110 to control the variable displacement mechanism 108 based on the sensor data from the sensor 114 to support flow demands from one or more downstream systems 116.

The FSV 112 includes an FSV inlet 120, an FSV outlet 122, and a valve member 124. A biasing member 126 can bias the valve member 124 in a first direction, i.e. to the left as oriented in FIG. 1. Pressure of flow through the FSV 112 from the FSV inlet 120 to the FSV outlet 122 biases the valve member 124 in a second direction opposite the first direction, i.e. to the right as oriented in FIG. 1. The sensor 114 includes a position sensor, such as a linear variable differential transformer (LVDT) operatively connected to monitor position of the valve member 124 in the FSV 112 to generate the sensor data as feedback for the controller 118. The FSV 112 includes a pressure port 128 on a side of the valve member 124 opposite from the FSV inlet 120 and the FSV outlet 122, i.e. the pressure port 128 is on the right side of the valve member 124 as oriented in FIG. 1. A pressure line 130 connects the FSV outlet 122 and outlet line 106 in fluid communication with the pressure port 128 to accommodate fluid displacement for movement of the valve member 124.

Figure 2:
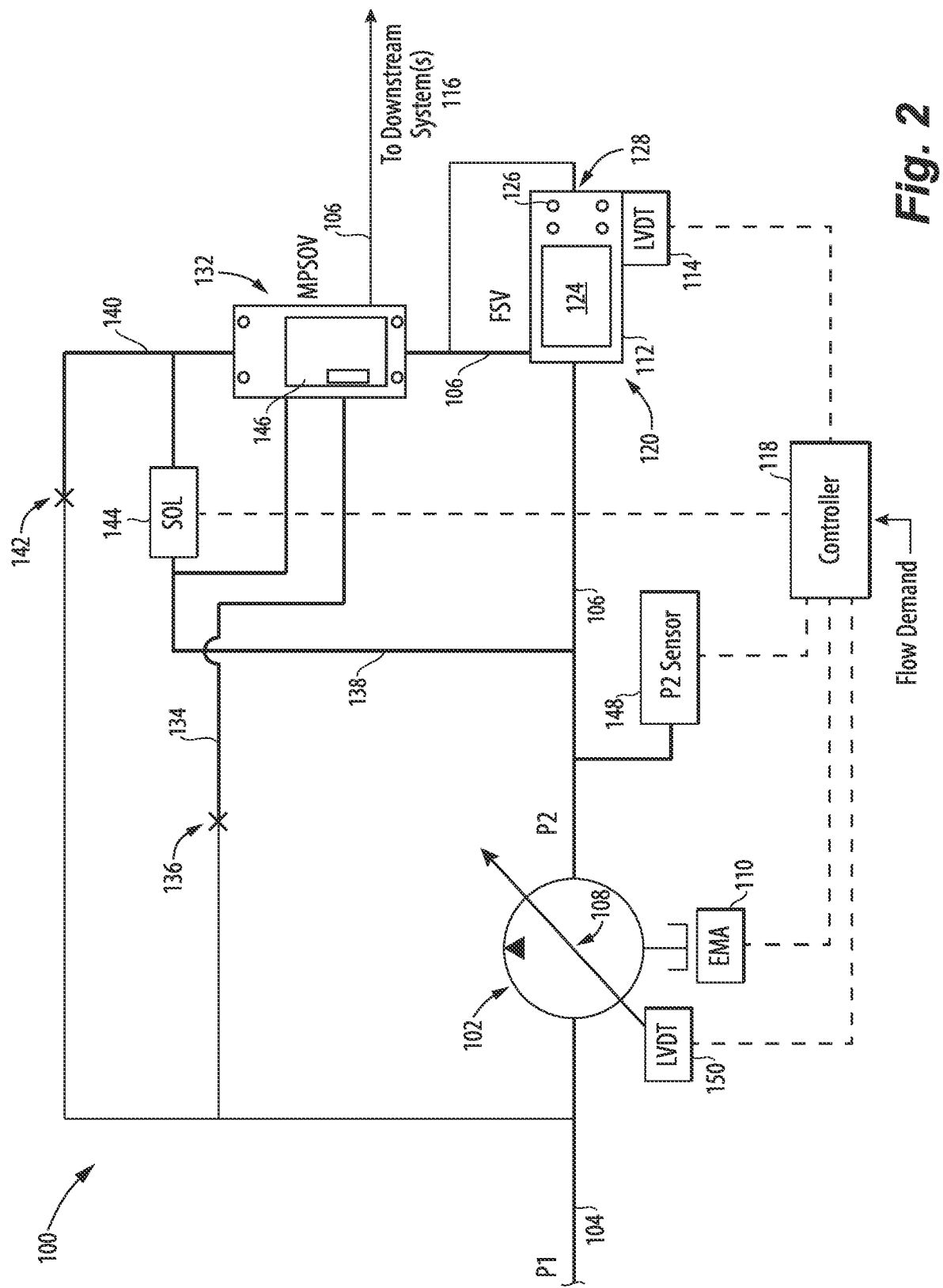
FIG. 2 is a schematic view of the system of FIG. 1, showing the MPSOV with its valve member in a second state or position.

A minimum pressure shutoff valve (MPSOV) 132 is connected in fluid communication with the outlet line 106, configured to block flow through the outlet line 106 for shutoff. A first MPSOV line 134 connects the MPSOV 132 in fluid communication with the inlet line 104. The first MPSOV line 134 includes a first fixed throttle 136. A second MPSOV line 138 connects the MPSOV 132 to the outlet line 106 for fluid communication. An MPSOV control line 140 connects the MPSOV 132 in fluid communication with the inlet line 140 through a second fixed throttle 142. A solenoid valve (SOL) 144 is connected in fluid communication with the outlet line 106, i.e. branching off from the second MPSOV line 138, and with the MPSOV control line 140 for actuating the MPSOV 132 between first and second states or positions. The first state or position is shown in FIG. 1, and the second state or position is shown in FIG. 2. The MPSOV 132 includes an MPSOV valve member 146 with a first position, in the MPSOV 132, as shown in FIG. 1, that connects the first and second MPSOV lines 134, 138 in fluid communication with one another and allows flow though the outlet line 106 to the one or more downstream systems 116. The MPSOV valve member 146 has a second position, shown in FIG. 2, that disconnects the first and second MPSOV lines 134, 138 from being in fluid communication with one another and also blocks flow through the outlet line 116 from reaching the downstream system(s) 116.

For fixed throttle 136, when the SOL 144 is closed and the MPSOV 132 is open, high pressure in the line 138 flows through the side land of the MPSOV 132 to the fixed throttle 136. This creates a modulating effect on the MPSOV 132 based on the amount the MPSOV 132 is open and the amount of flow it sends to the fixed throttle 136. Low downstream demands do not set enough pressure to maintain clamping within the pump internals so the MPSOV 132 modulates its pressure setting to maintain the relationship of $$P2-P1=\text{min Pump } dP,$$

where min Pump dP is the minimum pressure differential of the VDP 102, and where P2 equals the sum of the pressure of line 106 downstream of the MPSOV 132 plus the pressure differential across the MPSOV 132. When the SOL 144 is open, the MPSOV 132 is driven shut, its window is closed shutting off flow through this circuit. For the fixed throttle 142, when the SOL 144 is closed, the pressure behind the MPSOV 132 is low, allowing the pump pressure to open the MPSOV 132. When the SOL is open the high pressure floods the cavity of the MPSOV 132, so the orifice of the fixed throttle 142 is sized to flow less than the SOL 144 so that the pressure can remain elevated to ensure the MPSOV 132 stays closed. As pump speed and pressure output decay, the pressure in that cavity of the MPSOV 132 will eventually equalize to P1 pressure, but by then P2 pressure is so low that the MPSOV 132 can be held closed by its spring. Minimum pressure is set based on the P1 pressure, spring force in the MPSOV 132 and the modulated pressure at the mid stage of the MPSOV 132, per the response to fixed throttle 136.

The SOL 144 is operatively connected to the controller 118 for the controller 118 to switch states of the MPSOV 132. A pressure sensor 148 is operatively connected to the outlet 106 line to generate sensor output indicative of pressure in the outlet line 106. The pressure sensor 148 is operatively connected to the controller 118 for active control of the variable displacement mechanism 108 and/or of the MPSOV 132 based on pressure in the outlet line 106. A position sensor 150, e.g. an LVDT, is operatively connected to the variable displacement mechanism 108 to provide sensor output indicative of position of the variable displacement mechanism 108. The position sensor 150 is operatively connect the controller 118 to provide feedback for controlling the variable displacement mechanism 108.

A method includes directly controlling the VDP 102 by actuating the variable displacement mechanism 108 with the EMA 110. The method includes receiving sensor feedback from the FSV 112 indicative of flow supplied to a downstream system or systems 116 supplied from an outlet line of a variable displacement pump (VDP). The method can include receiving input indicative of the flow demand, as indicated in FIG. 1 with the flow demand arrow into the controller 118. The method includes controlling the MPSOV 132 to set or enforce a minimum pressure of the outlet line 106. The MPSOV 132 is connected to be used to selectively shut off flow in the outlet line 106. Directly controlling the VDP 102 and controlling the MPSOV 132 are done based at least in part on the pressure data from the sensor 148. Directly controlling the VDP 102 and controlling the MPSOV 132 include directly controlling the VDP 102 and controlling the MPSOV 132 based on position of the valve member 124 of the FSV 112. Controlling the MPSOV 132 includes shutting off flow from the outlet line 106 to one or more downstream systems 116 in response to pressure below the set minimum pressure of the outlet line 106 upstream of the MPSOV 132. The controller 118 can set pump position of the variable displacement mechanism 108 to maintain a pressure and flow schedule to support flow demands for a gas generator or augmenter or the like. The controller 118 can use the MPSOV 132 to set or enforce the minimum pressure and to provide fast shut-off response.

The systems and methods as disclosed herein provide potential benefits such as the following. They can reduce valve count over legacy fuel controls. They can provide faster metering over legacy systems.

The methods and systems of the present disclosure, as described above and shown in the drawings, provide direct electrical actuation control for variable displacement pumps, such as for use in metering/supplying fuel to gas generators in aircraft engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a variable displacement pump (VDP) in fluid communication with an inlet line and with an outlet line, wherein the VDP includes a variable displacement mechanism;
   an electromechanical actuator (EMA) operatively connected to actuate the variable displacement mechanism;
   a flow sensing valve (FSV) connected in the outlet line, wherein the FSV includes a sensor configured to generate sensor data indicative of flow out of the outlet line;
   a controller operatively connected to the EMA to control the variable displacement mechanism based on the sensor data to support flow demands from one or more downstream systems;
   a minimum pressure shutoff valve (MPSOV) fluidically connected to the outlet line;
   a first MPSOV line connecting the MPSOV in fluid communication with the inlet line, wherein the first MPSOV line includes a first fixed throttle;
   a second MPSOV line connecting the MPSOV to the outlet line for fluid communication;
   an MPSOV control line that connects the MPSOV in fluid communication with the inlet line through a second fixed throttle; and
   a solenoid valve (SOL) connected in fluid communication with the outlet line and with the MPSOV control line for actuating the MPSOV between first and second states, wherein the MPSOV includes an MPSOV valve member with a first position in the MPSOV that connects the first and second MPSOV lines in fluid communication and allows flow though the outlet line, and a second position that disconnects the first and second MPSOV lines from being in fluid communication and blocks flow through the outlet line.

2. The system as recited in claim 1, wherein the FSV includes an FSV inlet, an FSV outlet, and a valve member, wherein a biasing member biases the valve member in a first direction, and wherein pressure of flow through the FSV from the FSV inlet to the FSV outlet biases the valve member in a second direction opposite the first direction.

3. The system as recited in claim 2, wherein the sensor includes a position sensor operatively connected to monitor position of the valve member in the FSV to generate the sensor data as feedback for the controller.

4. The system as recited in claim 3, wherein the FSV includes a pressure port on a side of the valve member opposite from the FSV inlet and the FSV outlet, wherein a pressure line connects the FSV outlet in fluid communication with the pressure port.

5. The system as recited in claim 1, wherein the SOL is operatively connected to the controller for the controller to switch states of the MPSOV.

6. The system as recited in claim 5, further comprising a pressure sensor operatively connected to the outlet line to generate sensor output indicative of pressure in the outlet line, wherein the pressure sensor is operatively connected to the controller for active control of the variable displacement mechanism and/or of the MPSOV based on pressure in the outlet line.

7. The system as recited in claim 1, wherein a position sensor is operatively connected to the variable displacement mechanism to provide sensor output indicative of position of the variable displacement mechanism, wherein the position sensor is operatively connect the controller to provide feedback for controlling the variable displacement mechanism.

8. A method comprising:
   directly controlling a variable displacement pump (VDP) by actuating a variable displacement mechanism of the VDP with an electromechanical actuator (EMA);
   receiving sensor feedback from a flow sensing valve (FSV) indicative of flow supplied to a downstream system supplied from an outlet line of the VDP;
   controlling a minimum pressure shutoff valve (MPSOV) to open the outlet line of the VDP downstream of the FSV, wherein the MPSOV is in fluid communication with the FSV, the outlet line of the VDP, and a solenoid valve (SOL), wherein controlling the MPSOV to open the outlet line of the VDP comprises:
   signaling, by an electronic controller, the SOL to move to a closed position that fluidically disconnects a MPSOV control cavity from the outlet of the VDP;
   moving a MPSOV valve member to a first state by draining the MPSOV control cavity via a first fixed throttle fluidically connected to an inlet of the VDP and by pressure from the outlet line of the VDP acting on the MPSOV valve member, wherein the outlet line of the VDP is open downstream of the FSV when the MPSOV valve member is in the first state; and
   fluidically connecting, by a window of the MPSOV valve member, a first MPSOV line and a second fixed throttle, wherein the first MPSOV line fluidically connects the window to the outlet line of the VDP wherein the second fixed throttle fluidically connects the window to the inlet of the VDP.

9. The method as recited in claim 8, further comprising receiving pressure data from a pressure sensor in the outlet line.

10. The method as recited in claim 9, wherein directly controlling the VDP and controlling the MPSOV are done based at least in part on the pressure data.

11. The method as recited in claim 8, further comprising receiving data from a sensor indicative of position of a valve member of the FSV, wherein directly controlling the VDP and controlling the MPSOV include directly controlling the VDP and controlling the MPSOV based on position of the valve member.

12. The method as recited in claim 8, wherein controlling the MPSOV includes shutting off flow from the outlet line to one or more downstream systems in response to pressure below the minimum pressure of the outlet line upstream of the MPSOV.

13. The method as recited in claim 8, wherein directly controlling the VDP includes receiving input from a position sensor operatively connected to the variable displacement mechanism to provide sensor output indicative of position of the variable displacement mechanism, and using the sensor output as feedback for controlling the variable displacement mechanism.

14. The method as recited in claim 8, further comprising:
signaling, by the electronic controller, the SOL to move to an open position that fluidically connects the MPSOV control cavity to the outlet of the VDP;
moving the MPSOV valve member to a second state by filling the MPSOV cavity with fluid from the outlet line of the VDP flowing through the SOL and producing a pressure acting on the MPSOV valve member, wherein the outlet line of the VDP is closed downstream of the FSV when the MPSOV valve member is in the second state; and
fluidically disconnecting, by movement of the window of the MPSOV valve member, the first MPSOV line and the second fixed throttle, wherein the first MPSOV line begins at the outlet line of the VDP and ends at the MPSOV valve member, and wherein the second fixed throttle no longer permits fluid to flow from the first MPSOV line, via the window of the MPSOV valve member, to the inlet of the VDP.

\* \* \* \* \*